United States Patent [19]

Kanesaka

[11] Patent Number: 4,589,859

[45] Date of Patent: May 20, 1986

[54] CONTINUOUSLY VARIABLE TRANSMISSION

[75] Inventor: Hiroshi Kanesaka, Kawasaki, Japan

[73] Assignees: Usui Kokusai Sangyo Kabushiki Kaisha, Shizuoka Prefecture; Kabushiki Kaisha Kanesaka Gijutsu Kenkyusho, Kawasaki, both of Japan

[21] Appl. No.: 658,272

[22] Filed: Oct. 5, 1984

[30] Foreign Application Priority Data

Feb. 18, 1984 [JP] Japan ........................ 28002

[51] Int. Cl.⁴ .................... F16H 11/00; F16H 7/02
[52] U.S. Cl. ................................. 474/148; 474/28; 474/167
[58] Field of Search ............... 474/166, 167, 28, 16, 474/148, 110

[56] References Cited

U.S. PATENT DOCUMENTS

| | | | |
|---|---|---|---|
| 2,459,377 | 1/1949 | Halliman | 474/22 |
| 2,920,494 | 11/1960 | Dodwell | 474/167 X |
| 3,494,210 | 2/1970 | Ashton et al. | 474/28 X |

*Primary Examiner*—Stuart S. Levy
*Assistant Examiner*—Katherine Matcki
*Attorney, Agent, or Firm*—Anthony J. Casella; Gerald E. Hespos

[57] ABSTRACT

A continuously variable transmission for a vehicle (FIG. 1) has a drive pulley (4), a driven pulley (11), and a tension pulley (19) each having a pair of axially spaced rotors. The opposed inner faces of the rotors of each pulley are formed with slopes which have gradients with respect to the respective axis of rotation increasing continuously in proportion to the radii of the faces. A plurality of belts made up of thin bands (22a, 22b, 22c) run on the three pulleys (4, 11, 19) such that the respective band edges are in contact with the respective slopes of the three pulleys. The distances between the respective slopes of the drive and driven pulleys are variable, so that the rotating speed ratio between the drive and driven pulleys can be varied by varying the contacting radii of the belts with the drive and driven pulleys, while uniform tension is imparted to the belts by the tension pulley.

2 Claims, 5 Drawing Figures

CONTINUOUSLY VARIABLE TRANSMISSION

BACKGROUND OF THE INVENTION

1. Field of the Invention:

This invention relates to a vehicle transmission and more particularly to a continuously variable transmission (which will be referred to herein as a "CVT") for transmitting power at variable speed by means of belts running in pulleys of variable groove width.

2. Description of the Prior Art:

By adopting the CVT as a vehicle transmission, there have been made in the prior art attempts to facilitate the gear shifting or gear changing operation, to improve acceleration, and to reduce fuel consumption, by selecting such a load or such a speed of rotation at vehicle cruising speed as to use substantially the highest thermal efficiency of the engine of the vehicle. One example is known in which such an attempt has succeeded in an automobile having a small engine.

However, most existing CVTs use the known system in which power is transmitted through point contact. Increase of the contact force with a view to increasing power transmission capacity is limited by the allowable Hertz stress of a material, so that CVTs are not generally suitable for transmission of high power. In another known system, power is transmitted by line contact instead of by point contact. However, since the transmission to be theoretically carried out by point contact is conducted through line contact, slipping occurs in the segment other than the portion where the point contact theoretically dominates. As a result, friction loss is increased so as not only to reduce transmission efficiency substantially, but to generate heat through the lost energy and so reduce the reliability of the system. In addition it is the current practice that apparatus for transmitting a power as much as several hundred horse power is of large size, so that it is difficult to find a market because of its heavy weight or high price.

SUMMARY OF THE INVENTION

An object of this invention is to provide a relatively light, small, inexpensive and reliable CVT in which a number of belts composed of thin bands run in variable width grooves of pulleys so that considerable friction may be established between the belts and the pulleys, to transmit high torque at high efficiency.

According to this invention, a continuously variable transmission comprises:- a drive pulley including a drive shaft rotatable relative to a stationary body, and a pair of rotors mounted on the drive shaft and together rotatable with the drive shaft, the rotors being spaced axially such that their opposed inner faces are formed with slopes such as have their gradients with respect to the central axis of the drive shaft increasing continuously in proportion to their radii; a driven pulley including a driven shaft rotatable relative to the stationary body, and a pair of rotors mounted on the driven shaft and together rotatable with the driven shaft, the rotors being spaced axially such that their opposed inner faces are formed with slopes such as have their gradients with respect to the central axis of the driven shaft increasing continuously in proportion to their radii; a tension pulley including an intermediate shaft fixed in the stationary body, and a pair of rotors mounted rotatably and axially movably by the intermediate shaft and spaced axially such that their opposed inner faces are formed with slopes such as have their gradients with respect to the central axis of the intermediate shaft increasing continuously in proportion to their radii; a plurality of belts composed of thin bands running on the drive pulley, the driven pulley and the tension pulley such that the respective belt edges are in contact with the respective slopes of the drive, driven and tension pulleys; and means for varying the distance between the respective slopes of the drive and driven pulleys, whereby the rotating speed ratio between the drive and driven pulleys can be varied by varying the contact radii of the belts with the drive and driven pulleys while imparting substantially uniform tension to the belts, respectively, by the tension pulley.

BRIEF DESCRIPTION OF THE DRAWINGS

The invention will now be described by way of example, with reference to the drawings; in which:-

DETAILED DESCRIPTION OF PREFERRED EMBODIMENTS

Figure 1:
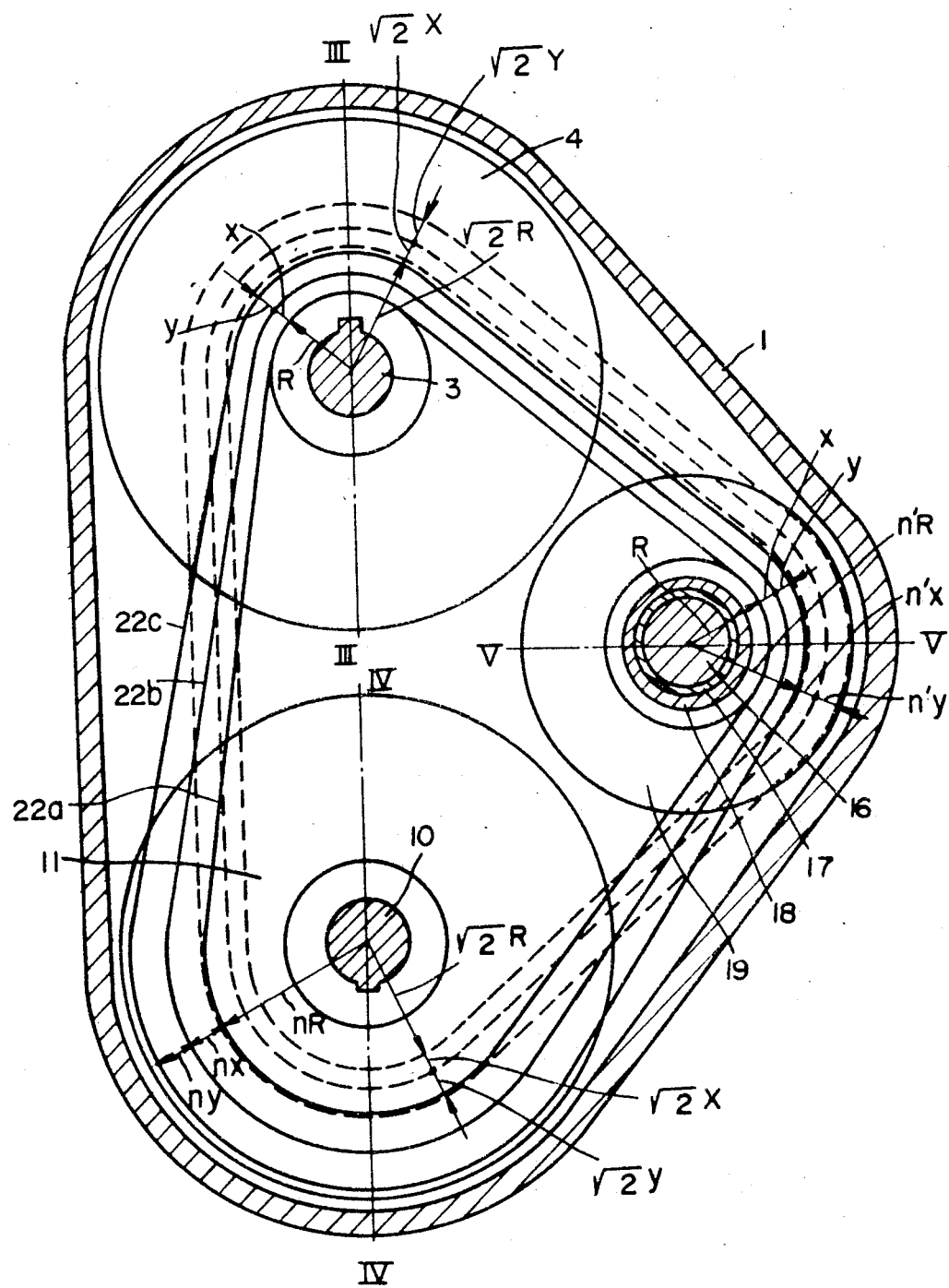
FIG. 1 is a top plan view showing one embodiment of a CVT in accordance with this invention, for a speed ratio of 1:2 (solid lines) and for a speed ratio of 1:1 (broken lines)
Figure 2:
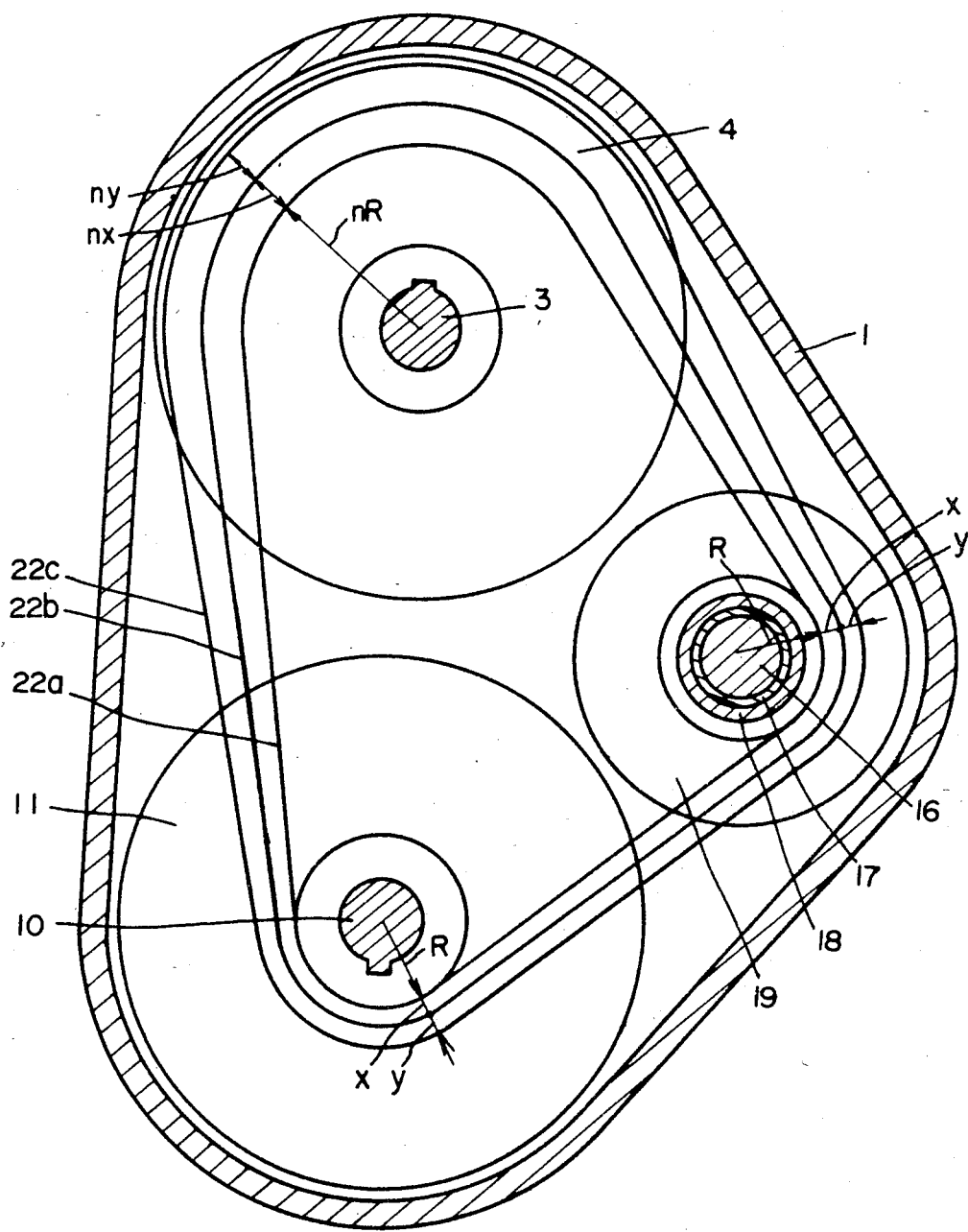
FIG. 2 is similar to FIG. 1 but for a speed ratio of 2:1.

Referring to the drawings, the CVT of this invention mainly comprises, see FIGS. 1 and 2, a drive pulley 4, a driven pulley 11 and a tension pulley 19, which pulleys are respectively mounted axially slidably on a drive shaft 3, a driven shaft 10, and an intermediate shaft 16 supported by a stationary body or casing 1,; and a plurality of belts comprising thin bands, which run on the three pulleys. The drive pulley 4 is mounted (FIG. 3) on the drive shaft 3, which is mounted in the body 1 by bearings 2a and 2b, in such manner as to transmit its rotation to the drive shaft 3 and to be slidable in the axial direction. The drive pulley 4 includes a pair of spaced rotors 4c and 4d, their opposed inner faces being formed with exponentially curved surfaces 4a and 4b having their gradients increasing continuously in proportion to their radii, so as to form a V-shaped groove. The rotors 4c and 4d are connected to annular pistons 7a and 7b, which are fitted in the body 1 behind the respective rotors by means of bearings 8a and 8b, respectively. A working fluid, which is accumulated in an accumulator (not shown) and which has its flow rate and pressure adjusted by a regulator valve (not shown), is introduced via oil passages 5a and 5b into chambers 6a and 6b located behind the pistons 7a and 7b to thrust the pistons 7a and 7b so that the rotors 4c and 4d can be biassed toward each other to reduce the spacing between the surfaces 4a and 4b of the drive pulley 4.

Figure 4:
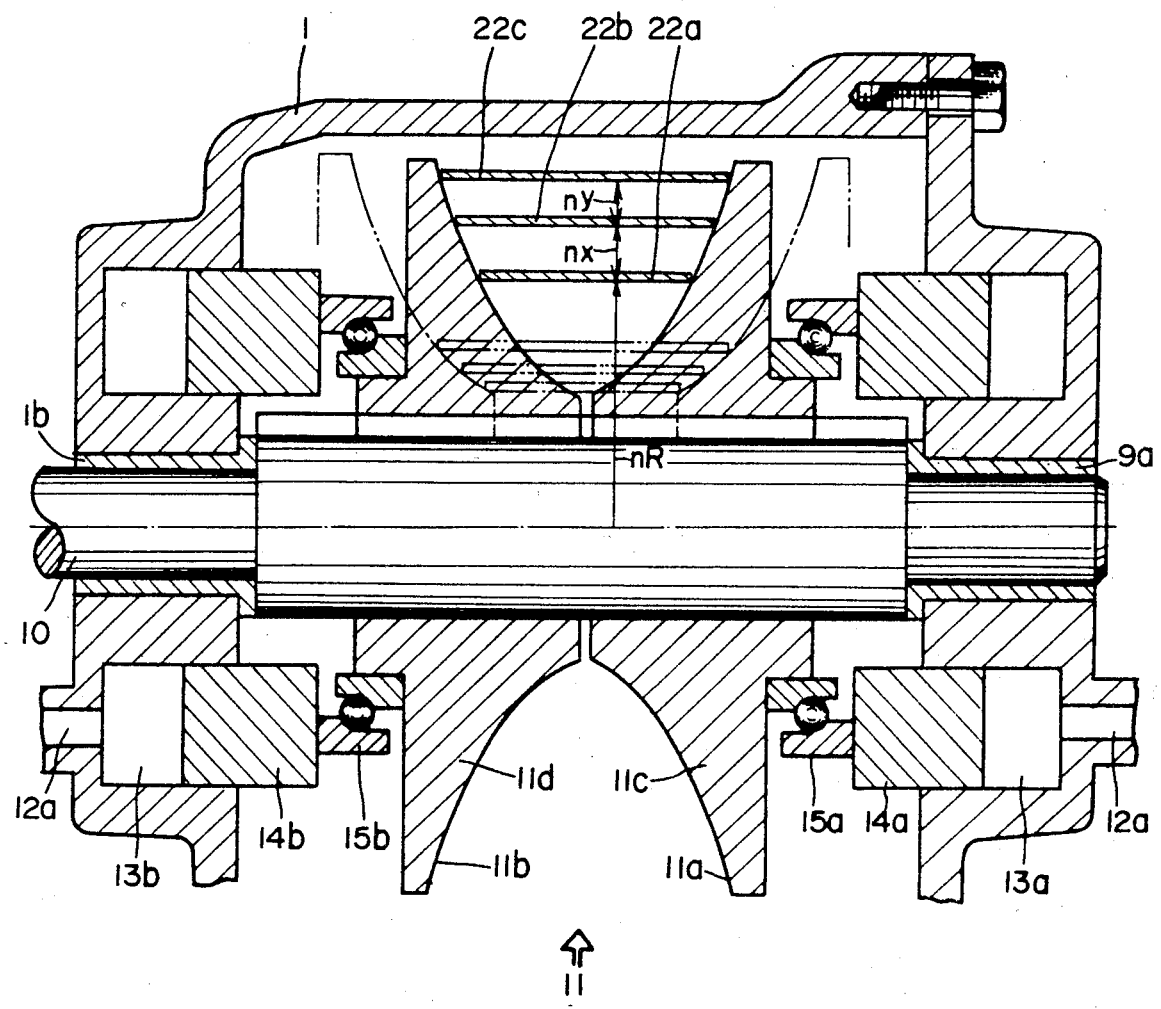
FIG. 4 is a section on the plane IV—IV of FIG. 1.

The driven pulley 11 is similarly mounted (FIG. 4) on the driven shaft 10, which is mounted in the body 1 by bearings 9a and 9b, in such manner as to transmit its rotation to the driven shaft 10 and to be slidable in the axial direction. The driven pulley 11 includes a pair of spaced rotors 11c and 11d, their opposed inner faces being formed with exponentially curved surfaces 11a and 11b having their gradients increasing continuously in proportion to their radii, so as to form a V-shaped groove. The rotors 11c and 11d are connected to annular pistons 14a and 14b, which are fitted in the body 1 behind the rotors by bearings 15a and 15b, respectively. A working fluid, which is accumulated in an accumulator (not shown) and which has its flow rate and pressure adjusted by a regulator valve (not shown), is introduced via oil passages 12a and 12b into chambers 13a and 13b located behind the pistons 14a and 14b to thrust the pistons 14a and 14b so that the rotor 11c and 11d can be biassed toward each other to reduce the spacing between the surfaces 11a and 11b of the driven pulley 11.

Figure 5:
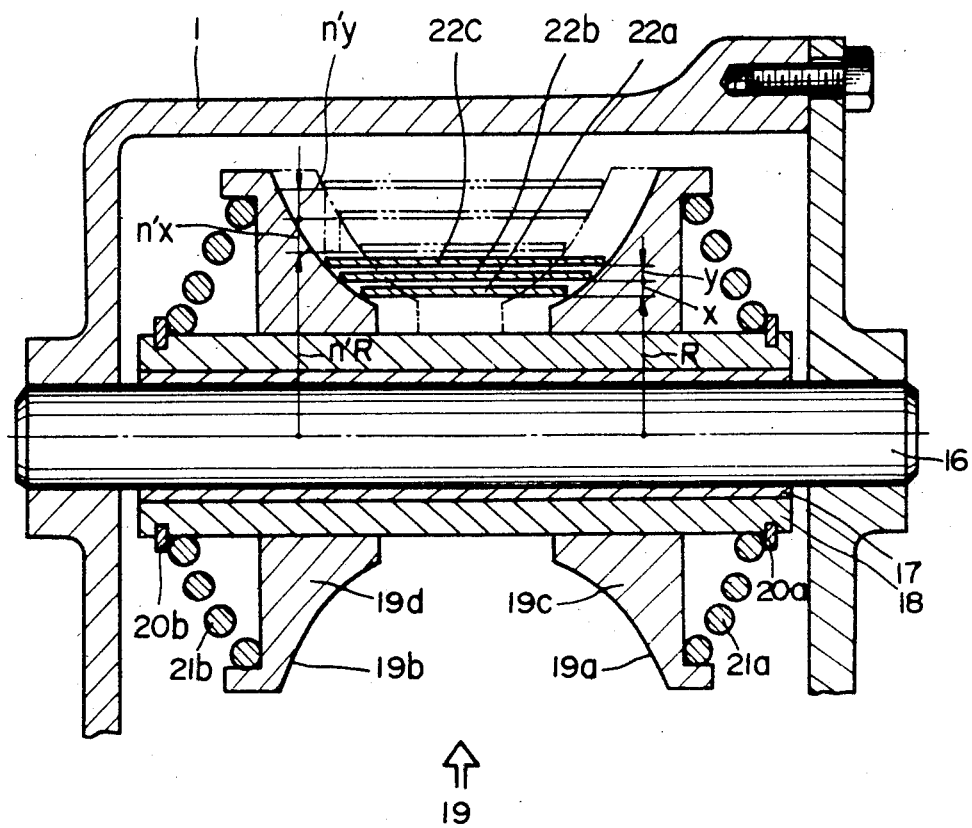
FIG. 5 is a section on the plane V—V of FIG. 1.

FIG. 5 shows the tension pulley 19. It is mounted axially movably on a sleeve 18 which is rotatably mounted on a bearing sleeve 17 on the intermediate shaft 16 which is mounted in the body 1, as shown. Like the drive pulley 4 and the driven pulley 11, the tension pulley 19 includes a pair of spaced rotors 19c and 19d whose opposed inner faces are formed with such exponentially curved surfaces 19a and 19b as have their gradients increasing continuously in proportion to their radii so as to form a V-shaped groove. The rotors 19c and 19d are biased to reduce the spacing between their surfaces 19a and 19b by the actions of springs 21a and 21b, each have one end retained by respective snap rings 20a and 20b fixed on the ends of the sleeve 18. As a result, tension for the frictional force necessary for power transmission is established in the belts 22 (e.g. 22a, 22b and 22c in the present embodiment) which run on the drive pulley 4, driven pulley 11 and tension pulley 19.

Figure 3:
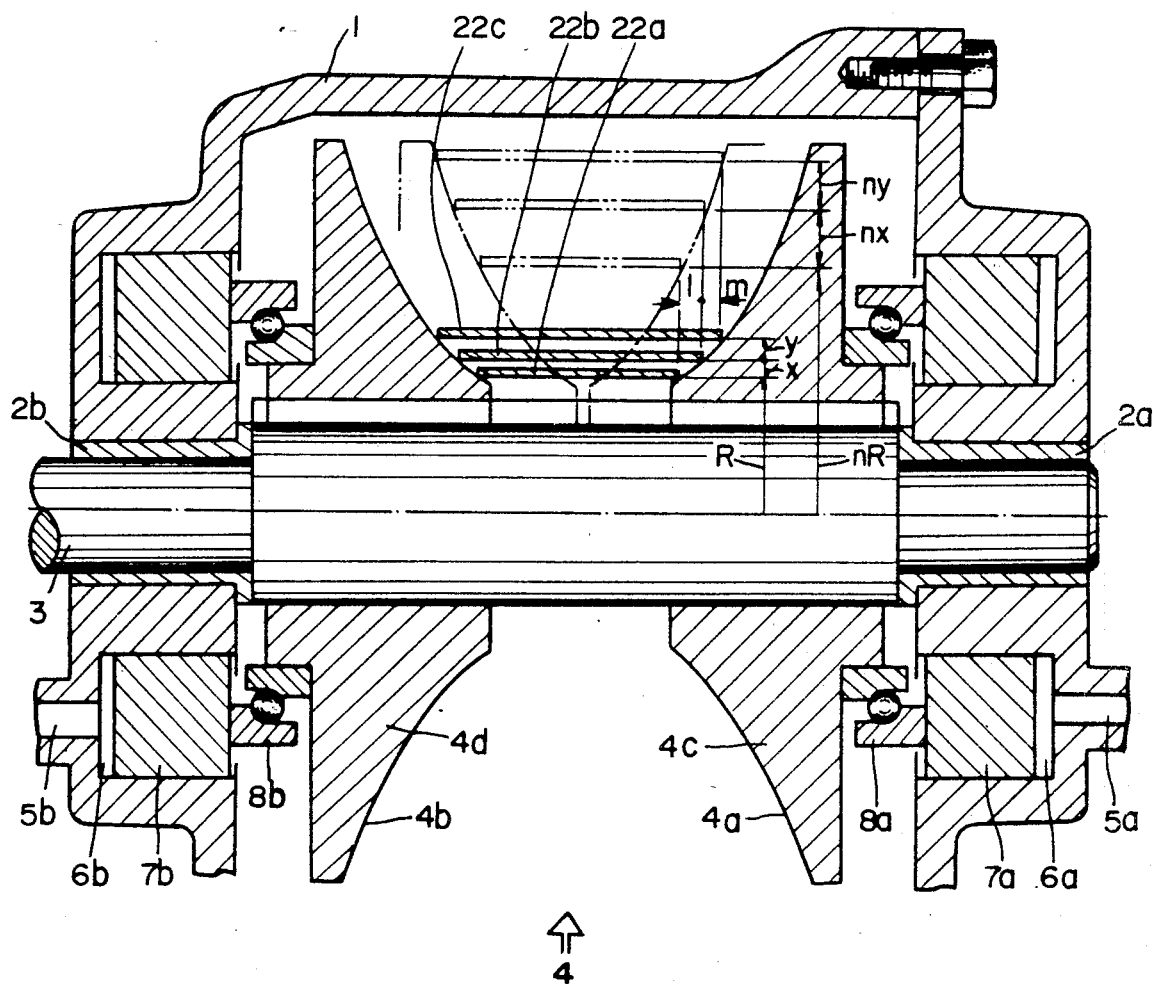
FIG. 3 is a section on the plane III—III of FIG. 1.

The surfaces 4a, 4b; 11a, 11b; and 19a and 19b of the rotors of the three pulleys 4, 11 and 19 are of identical shape, as will be explained with reference to FIG. 3. The gradient with respect to each centrl axis, or the slope at particular locations on each surface 4a, 4b, 11a, 11b, 19a, 19b is denoted by $x/1$ at a radius R around the central axis, wherein x is a radial distance and 1 is an axial distance. Specifically, the surfaces are defined by a continuous curve $nx/1$ at a radius $nR$, wherein n is a number greater than 1. Thus the surfaces have their gradients increasing in proportion to their radii. The belts 22 are composed, in this embodiment, of three thin bands 22a to 22c, and the widths of the belts 22 are such that the band 22b is spaced radially from band 22a by a distance x and is wider by 2l than the band 22a. Similarly the band 22c is spaced radially from band 22b by a distance y and is wider by 2 m than the belt 22b. Thus with the rotors 4c and 4d spaced at the maximum, the bands 22a, 22b and 22c are in contact with the respective surfaces at the radii R, R+x and R+x+y.

Operations of the CVT of this invention will now be described. Firstly the width of the groove of the drive pulley 4 is adjusted to that shown in full lines in FIG. 3 by actuating the pistons 7a and 7b to move the rotors 4c and 4d. Thus the bands 22a, 22b and 22c contact the surfaces 4a and 4b at the radii R, R+x, and R+x+y, respectively. At the same time, the groove width of the driven pulley 11 is reduced to that shown in full lines in FIG. 4 (i.e. that shown by dash-dotted lines in FIG. 3) by actuating the pistons 14a, 14b to move the rotors 11c and 11d. Thus the bands 22a, 22b and 22c are in contact with the surfaces 11a and 11b at the radii nR, nR+nx, and nR+nx+ny, respectively. At this time, the band 22a transmits power at the radial ratio of nR/R=n between the drive pulley 4 and the driven pulley 11; the band 22b transmits power at the radial ratio of (nR+nx)/(R+x)=n; and the band 22c transmits power at the radial ratio of (nR+nx+ny)/(R+x+y)=n. Thus, the individual bands can transmit power at the same speed ratio of 1/n. At this time, the tension pulley 19 is brought into contact with the band 22a at the minimum radius R, the band 22b at the radius (R+x) and the band 22c at the radius (R+x+y) to tension the individual bands while havings its rotors 19c and 19d biassed by the springs 21a and 21b. The embodiment shown in FIGS. 1 and 3 to 5 corresponds to the case in which the speed ratio between the drive shaft 3 and the driven shaft 10 is set at ½ in the CVT having the maximum speed change ratio 4. In this particular case, the coefficient n is 2. Then individual bands 22a, 22b and 22c are caused, as shown by the solid lines in FIG. 1, to run on the drive pulley 4, the driven pulley 11 and the tension pulley 19, and the respective bands and pulleys are held in line contact at a constant radial ratio so that power can be transmitted without undue slip.

FIG. 2 shows the case in which the speed ratio is set at 2 in the CVT of the invention. In this case, the width of the drive pulley 4 is reduced, as shown by the dash-dotted lines in FIG. 3, so that it contacts at the coefficient n=2 with the bands 22a, 22b and 22c. On the other hand, the driven pulley 11 is widened, as shown by the dash-dotted lines in FIG. 4, so that it contacts at the coefficient n=1 with the bands 22a, 22b and 22c. On the contrary, the tension pulley 19 contacts with the bands 22a, 22b and 22c at the same position as shown in FIG. 1. As a result, the running shape of the bands become symmetrical to that of FIG. 1.

Next, the case in which power is to be transmitted at another speed ratio by the CVT will be explained with reference to the broken lines of FIG. 1 by taking the speed ratio of 1 as an example. To give the speed ratio of 1, the groove width of the drive pulley 4 is varied in the following fashion. For the individual belts 22, specifically, the bands 22a, 22b and 22c contact the surfaces 4a and 4b of the rotors 4c and 4d at the radii $\sqrt{2}R$, $\sqrt{2}R+\sqrt{2}x$, and $\sqrt{2}R+\sqrt{2}x+\sqrt{2}y$, respectively. In the driven pulley 11, the individual bands 22a, 22b and 22c contact the surfaces 11a and 11b of the rotors 11c and 11d at the same radii as those of the drive pulley 4 and at the coefficient n=$\sqrt{2}$. Under the above-specified condition, however, the band lengths needed for application of the required tension for power transmission between the two pulleys becomes shorter as a whole than that at the speed ratio of ½ so that it has to be corrected by the third pulley, i.e. the tension pulley. A first reason for this is that the coefficient n=$\sqrt{2}$ is used for the intermediate speed ratio 1 between the speed ratios ½ and 2 although the varying rate of the necessary length of the bands is low for the coefficient n=1.5. The comparison between the solid lines indicating the speed ratio of ½ of FIG. 1 and the broken lines indicating the speed ratio of 1 in connection with the bands 22a to 22c makes it apparent that the required length of the bands between the drive shaft 3 and the driven shaft 10 is shorter. A second reason is that, at the speed ratio of ½, as shown by the solid lines in FIG. 1, the angles of inclination of the individual bands with respect to the centre line joining the drive shaft 3 and the driven shaft 10 are larger for the band 22b than for the band 22a, and for the band 22c than for the band 22b so that the outer band requires a larger length than the inner band in accordance with the angle of inclination. Therefore, the tension pulley 19 reduces the spacing between its surfaces 19a and 19b, as shown by the dashdotted lines in FIG. 5, by action of the springs 21a and 21b such that the lengths required of the individual bands become equal at the speed ratio of ½, as shown by the broken lines in FIG. 1, while being corrected by varying the coefficient n of the running radii of the pulley 19 on the bands 22a, 22b and 22c, to apply a uniform tension to the bands, so that the individual bands may transmit power in accordance with their individual capacities. At this time, incidentally, the contacting radii of the pulley 19 with the belts 22 are enlarged at the ratio of n'R for the band 22a, at the ratio of (n'R+n'x) for the band 22b, and at the ratio of (n'R+n'x+n'y) for the band 22c so that the bands 22a, 22b and 22c rotate the tension pulley 19 at an equiangular velocity without substantial slip. More strict computation would reveal that an interference slip at a slipping coefficient of 0.02% between the belts occurs between the tension pulley 19 and the belts 22 if the ratio of the distance between the drive shaft 3 and the intermediate shaft 16, i.e. the distance between the driven shaft 10 and the intermediate shaft 16 to the distance between the drive shaft 3 and the driven shaft 10 is 1:1.3. The slipping coefficient at this level will not lead to an undue reduction in transmission efficiency for the CVT. This slipping coefficient can be further reduced if the distances between the shaft 16 and the drive shaft 3 and between the shaft 16 and the driven shaft 10 are changed during speed varying operations.

The above description of the invention is directed to the construction in which the belts 22 are composed of three components or bands. Despite this, the number of belt components is not limited in the sizing relationship between the pulleys and belts. In fact, several hundreds of belts composed of bands of thickness as large as 0.02 mm can be used, so that power as much as several hundred horse power can be transmitted at variable speed by means of the numerous belts which have a small transmission capacity.

Since the CVT of this invention is constructed as described above, the individual belts or bands have uniform tension so that slip between the pulleys and belts can be considerably reduced to enhance transmission efficiency. Because of the continuous contact between the pulleys and the belts, moreover, noise is low. Also belts composed of thin bands have such relatively low inertia that they can endure high-speed running. Again the speed of a high output can be varied by using the numerous belts. Thus a CVT in accordance with this invention can be simple, of small size and reliable.

I claim:

1. A continuously variable transmission comprising:
   a drive pulley including a drive shaft rotable relative to a stationary body, and a pair of rotors mounted on the drive shaft and together rotable with the drive shaft, the rotors being spaced axially such that their opposed inner faces are formed with curves having gradients with respect to the central axis of the drive shaft increasing continuously in proportion to their radii;
   a driven pulley including a driven shaft rotatable relative to the stationary body, and a pair of rotors mounted on the driven shaft and together rotatable with the driven shaft, the rotors being spaced axially such that their opposed inner faces are formed with curves having gradients with respect to the central axis of the driven shaft increasing continuously in proportion to their radii;
   a tension pulley including an intermediate shaft fixed in the stationary body, and a pair of rotors mounted rotatably and axially movably by the intermediate shaft and spaced axially such that their opposed inner faces are formed with curves having gradients with respect to the central axis of the intermediate shaft increasing continuously in proportion to their radii;
   a plurality of belts composed of thin bands running on the drive pulley, the driven pulley and the tension pulley such that the respective belt edges are in contact with the respective curved faces of the drive, driven and tension pulleys; and
   means for varying the distance between the respective curved faces of the drive and driven pulleys, whereby the rotating speed ratio between the drive and driven pulleys can be varied by varying the contact radii of the belts with the drive and driven pulleys while imparting substantially uniform tension to the belts, respectively, by the tension pulley.

2. A transmission according to claim 1, wherein the distance varying means comprises:- a pair of annular pistons fitted in the stationary body behind the rotors of each of the drive pulley and the driven pulley, the pistons being hydraulically actuated to move axially for biasing the rotors towards each other to reduce the spacing between the slopes of the rotors; and a pair of bearings disposed between the annular pistons and the backs of the rotors, respectively, for ensuring smooth rotation of the rotors relative to the pistons.

* * * * *